UNITED STATES PATENT OFFICE.

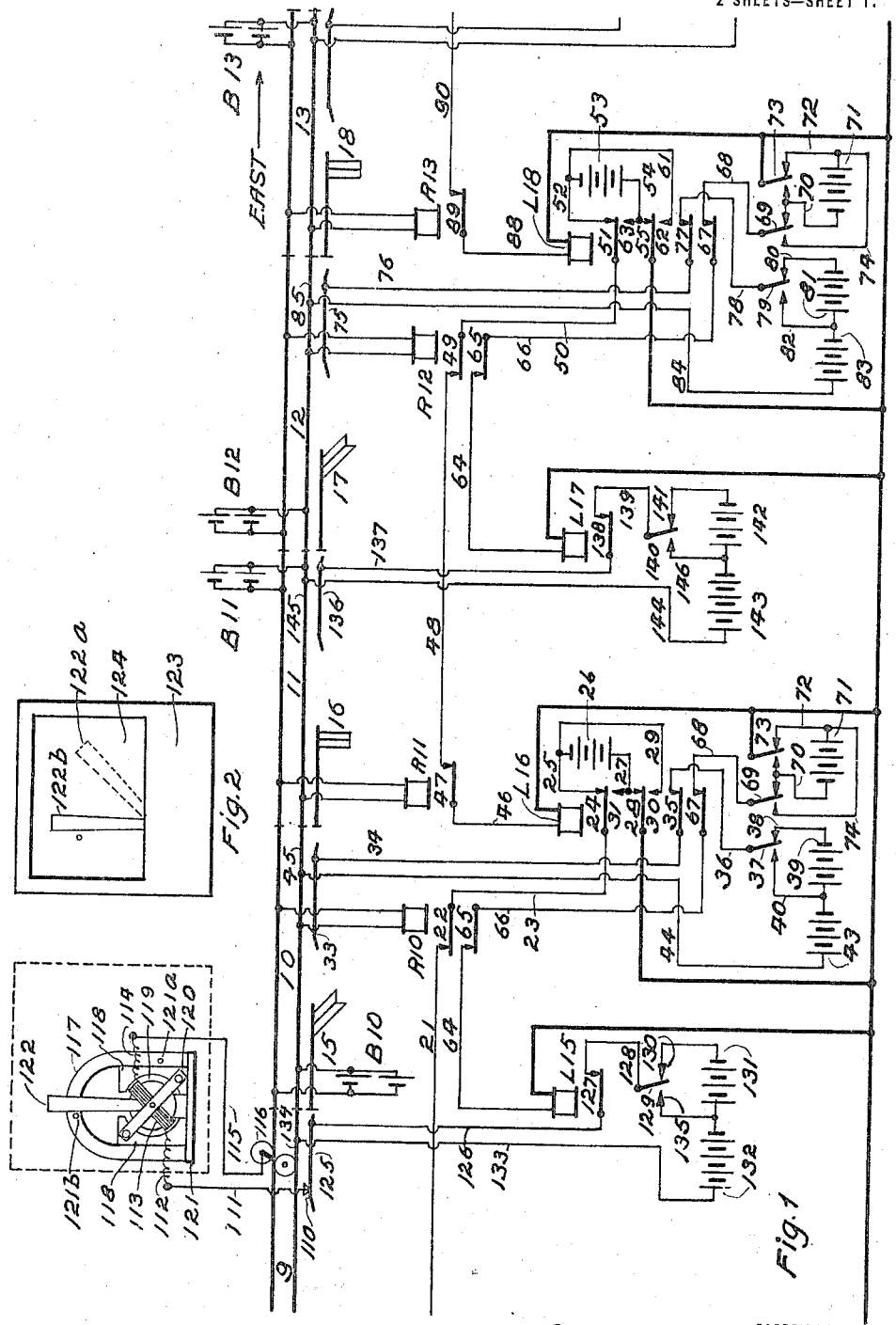

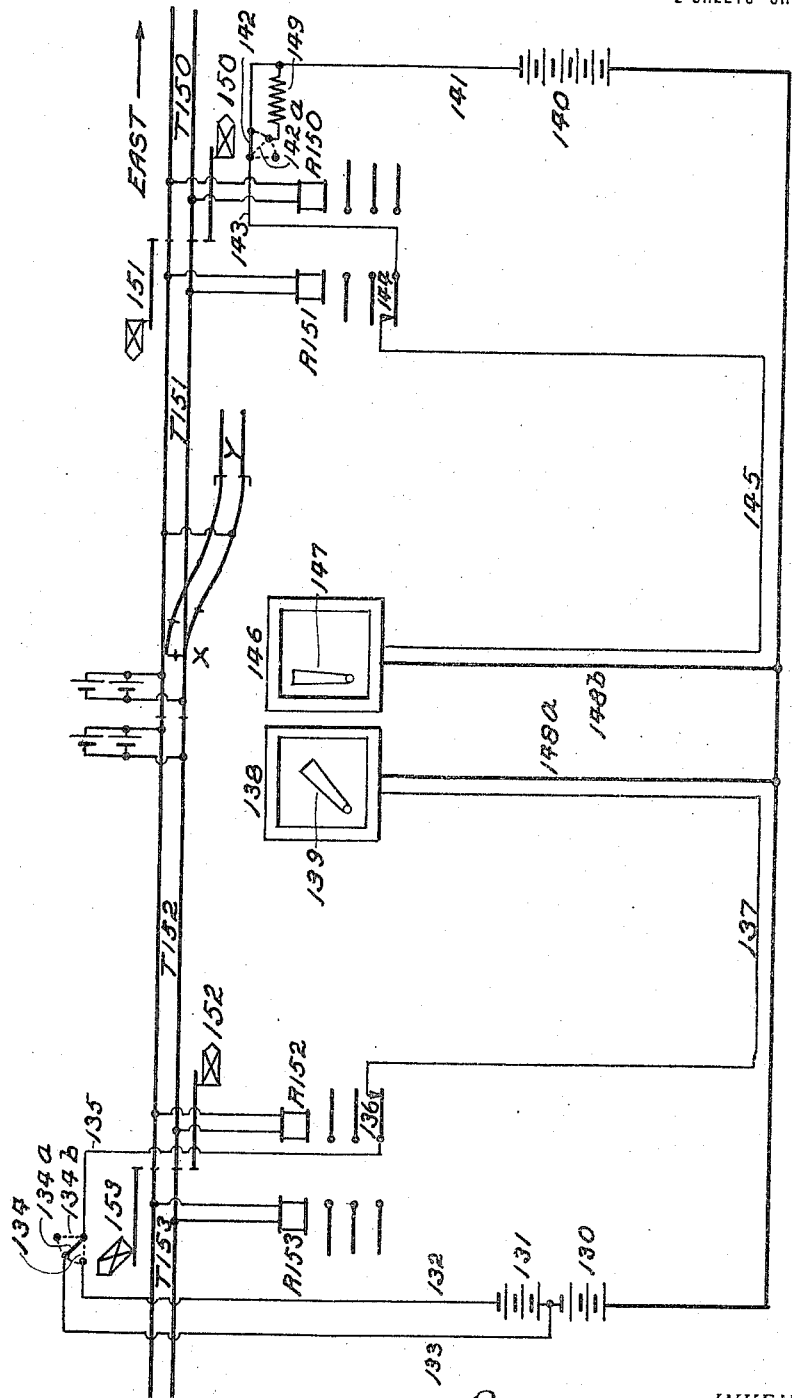

ROBERT J. HEWETT, OF WESTFIELD, NEW JERSEY.

RAILWAY SIGNAL SYSTEM.

1,237,905. Specification of Letters Patent. Patented Aug. 21, 1917.

Application filed February 10, 1917. Serial No. 147,744.

*To all whom it may concern:*

Be it known that I, ROBERT J. HEWETT, a citizen of the United States, residing at Westfield, in the county of Union and State of New Jersey, have invented certain new and useful Improvements in Railway Signal Systems, of which the following is a full, clear, and exact description.

This invention relates to railway signal systems and more particularly to signal systems in which the indications are received in a vehicle, such as the cab of an engine.

One of the objects of the invention is to provide a railway signaling system of this character which is of a simple construction and can be readily installed. In the preferred embodiment of the invention, this is obtained by the use of stationary masts or marker arms along the trackway which are positioned in positions corresponding to the "home" and "distant" semaphores of the ordinary track-signaling systems. The track circuits are arranged so that as the vehicle or cab approaches one of these home or distant markers, a signal is given in the cab which will inform the engineman whether to proceed or stop in accordance with the condition of traffic in the track-blocks in advance of the cab or vehicle. The signal indicator in the cab is a three-position indicator with its arm or dial normally held in a zero position. The arm of the signal indicator has a 90° movement and is adapted to be held at an intermediate or 45° position, the zero position indicating "danger" or "stop," the 90° position "safety" or "clear," and the 45° position "caution" in accordance with the well known signaling practice. The indicator is constructed so that the angular advance of its arm is proportionate to the strength of current passing therethrough, the arm being subjected at all times to a counter-torque tending to return it to its normal position. The zero position of the indicator is obscured so that a "stop" signal will not be continuously displayed. The electrical indicator may also be used for other systems besides the cab signaling system, for example, as a part of a switch indicator system.

In the drawings:

Figure 1 shows the indicator forming a part of a cab signal system;

Fig. 2 is a detail of the indicator; and

Fig. 3 shows the indicator forming a part of a switch indicator system at an outlying switch of a single track-road.

Referring first to Figs. 1 and 2, the cab signal system therein is adapted to give the three essential indications required in railway signaling; that is, "proceed," "proceed at caution" and "stop." However, the absence of a "proceed" indication must be regarded as a stop signal in accordance with the standard rules of railway signaling and in the preferred form of indicator shown in Fig. 2, the face of the indicator is so designed that in the "stop" position of the arm, the same is concealed from view, as will be later referred to.

In the cab signal system shown, the indicator is controlled by track-circuits which vary the strength of current delivered to a contact rail through which circuit connections to the indicator are completed and the indicator may be used as a means for controlling the train movements without the use of the usual roadside signals, or may be used in conjunction with roadside signals.

In the embodiment of the invention shown, the usual roadside signals are omitted and the block limits are designated in such a manner as to enable the engineer to know at what point along the roadway he may expect the indicator to give him an indication and also to give him information as to his location along the road. Roadside marker masts, which resemble the usual semaphores of the movable type of roadside signals are therefore utilized, by these marker masts are provided with inoperative or stationary marker arms, which are not controlled in any manner. The home block limits are designated by such devices and the home markers are designated 16 and 18. In the same manner the stationary arms 15 and 17 designate the positions along the road, which correspond to the position at which the distant roadside signals are placed. In the drawings, only one complete block of the track is shown, which extends from home marker 16 to home marker 18, the distant marker 15 occuping the position usually occupied by the distant signal for this block, or in other words, the marker 15 indicates to the engineer as he approaches the same that he should receive a distant signal regarding the condition of the block extending from home marker 16 to home marker 18, and in the same manner, the engineer is informed as he approaches home marker 16, that he should receive an indication in the cab informing him of the condition of this block. To the rear of each marker, there is positioned a contact rail for transmitting the current from the roadside control circuits to the cab indicator. These contact rails are designated 125, 33, 136 and 75. The cab signal is received while the engine is passing over the contact rail.

The cab signal or indicator is shown in the inclosure within the dotted square shown in the upper left hand corner of Fig. 1, and consists of a device which is constructed somewhat in accordance with the principles upon which an ammeter or voltmeter are constructed and comprises a permanent magnet 117 which carries pole-pieces 118, a stationary core 119 and a movable coil 113 which is rotatably mounted in bearings in bridge pieces 120, the parts being mounted upon a base plate 121. Connected for rotation to the movable coil 113 is a semaphore arm 122 which is substituted for the pointer or needle used in an ammeter. The precision of the instrument need not be great and no shunt is provided for the movable coil 113 so that the entire available current flows through the same which will cause a sufficient torque to permit the instrument to be made of a rugged design as desirable, as, for example, the jeweled bearings of an ammeter are not necessary as metallic bearings will give sufficient precision. The semaphore arm 122 is maintained in its horizontal position as shown in dotted lines in Fig. 2 by spiral springs 112 and 114 in Fig. 1, which springs are stronger, but of a similar construction to the spiral springs used in meters and exerts a counter-torque upon the arm normally holding it in one position, which torque increases as the arm 122 advances from that position. Stops 121ᵃ and 121ᵇ may be provided against which the semaphore arm 122 abuts when this arm is in its normal position and in its 90° position, respectively, the arm being held in an intermediate position without any stops by virtue of the fact that the torque produced by the current passing through the movable coil 113 is balanced by the counter-torque of the spiral springs 112 and 114. In Fig. 2, the semaphore arm and other parts of the indicator are shown inclosed in a suitable casing having a front cover 123 with an opening 124 therein provided with a transparent pane through which the semaphore arm may be seen. In the form of casing shown, the semaphore arm is visible only in its two operative positions, the normal or horizontal position of the semaphore arm being obscured by the lower part of the casing.

The indicator described is connected in circuit with a contact shoe 110 by a wire 111 which is connected to the spiral spring 112 through which the current passes to the movable coil 113. The other side of the movable coil is connected by spiral spring 114 and wire 115 to the wheels 116 of the locomotive.

Let us refer now to the system of track control circuits by which the cab indicator is controlled at a distant marker 15. The distant contact rail, as 125, is supplied with a current of minimum value when the polarized armature 129 is moved to engage contact 135 of battery 132 and is supplied with a current of maximum strength when both batteries 131 and 132 are placed in series by the engagement of the polarized armature 129 with the contact 130. In the same manner, at each of the home markers, the contact rails, as contact rail 33, is supplied with a current of different strength from batteries 43 and 39 depending upon the position of the polarized armature 37. In the same manner, contact rail 136 is supplied with currents whose circuits pass through batteries 142 and 143, and contact rail 75 is supplied with currents whose circuits pass through batteries 81 and 83, in each instance the current of one strength being passed through the contact rail when the polarized armature is moved in one direction and a current of double strength when the polarized armature is moved in the other direction. These current strengths are utilized for the 45° and 90° positions of the indicator arm, respectively.

The control circuits are as follows: Home line relay $L^{16}$ is a neutral polar relay and when energized by a current flowing in the normal direction will throw its polar contact armature 37 to the right (as shown) and when energized by a current flowing in the reverse direction, it will throw its polar contact 37 to the left. In either case its neutral contacts 24, 28, 35 and 67 will be closed. In the same manner, each of the distant line relays $L^{15}$ and $L^{17}$ are also provided with neutral and polarized contacts and a current passing through the relay $L^{15}$ in the normal direction will throw the polar contact 129 to the right, while a current passing in the reverse direction will throw it to the left, the neutral contact 127 being closed in either instance.

The line relay $L^{16}$ at the home marker 16, controls the block which extends from home marker 16 to home marker 18, the circuit being as follows: from line relay $L^{16}$, wire 46, contact 47 of track relay $R^{11}$, line wire 48, contact 49 of track relay $R^{12}$, wire 50, contact 51 of line relay $L^{18}$ for the next block, wire 52, battery 53, wire 54, front contact 55 controlled by line relay $L^{18}$ and common wire back to line relay $L^{16}$.

Line relay $L^{18}$ at marker 18 serves as a pole changer for battery 53. When relay $L^{18}$ is energized, the closed condition of its front contacts 51 and 55 delivers a current of normal direction to the line circuit wire 48, and thereby to the relay $L^{16}$, and this normal current will cause line relay $L^{16}$ to throw its polar contact 37 to the right (as shown) and also to attract its neutral armature and close neutral contacts 24, 28 and 35. When line relay $L^{18}$ at marker 18 is deenergized, the open condition of its front contacts 51 and 55 and the closed condition of its back contacts 63 and 62 will reverse the direction of current from the battery 53 which will then deliver a current of reverse direction to the line circuit-wire 48, which reversal of current will cause the polarity of the relay $L^{16}$ to be changed and cause it to throw its polar contact 37 to the left, as well as holding neutral contacts 24, 28, 35 and 67 in closed condition.

Polar contact 37 of relay $L^{16}$ serves as a current changer for delivering a current of maximum or minimum value from batteries 43 and 39 to home contact rail 33 and to its companion track rail 45. The current of maximum value is as follows: from home contact rail 33, wire 34, contact 35 of relay $L^{16}$, wire 36, polar contact 37, wire 38, batteries 39 and 43, and wire 44 to track rail 45. When polar contact 37 is thrown to the left, a current of minimum value will be delivered to home contact rail 33 and its companion track rail 45 as follows: from home contact rail 33, wire 34, contact 35, wire 36, polar contact 37, wire 40, battery 43, wire 44 to track rail 45. At home marker 18, the line relay $L^{18}$ is controlled by a similar line control circuit, partly shown, as by wire 88, contact 89 and wire 90, which extends to the next block. Line relay $L^{18}$ by its polar contact 79 serves as a current changer for delivering the current of maximum or minimum value from batteries 81 and 83 to home contact rail 75 and to companion track rail 85.

Line relay $L^{18}$ also serves as a pole changer for delivering current of different polarities from the battery 71 to the distant line relay $L^{17}$, the circuit being as follows: from the common wire to polar contact 73, wire 72, battery 71, wire 70, polar contact 69, wire 68, contact 67, wire 66, contact 65, distant line wire 64, distant line relay $L^{17}$ and the common wire back to polar contact 73. The polar contacts 69 and 73 are controlled by the line relay $L^{18}$ so that a reversal of current in this relay will cause these contacts to move from one position to the other. When the contacts are as shown in Fig. 1, current of normal direction will cause the polar contact 140 of relay $L^{17}$ to move toward the right and a maximum current to be supplied to distant contact rail 136 and its companion track rail 145 as follows: contact rail 136, wire 137, neutral contact 138, wire 139, polar contact 140, wire 141, batteries 142, 143, and wire 144 to track rail 145. A reversal of the current in the circuit wire 64 will reverse the polarity of distant line relay $L^{17}$ and cause the polar contact 140 to move toward the left and a current of minimum value will be supplied to distant contact rail 136 and its companion track rail 145 as follows: contact rail 136, wire 137, neutral contact 138, wire 139, polar contact 140, wire 146, battery 143, wire 144 to track rail 145.

In the same manner distant line relay $L^{15}$ is controlled by line circuit wire 64, the direction of current through which is controlled by the line relay $L^{16}$ which acts as a pole changer for battery 71 by virtue of its polar contacts 69 and 73, respectively.

The operation of the system will now be described more fully by considering the movement of two east bound trains over the several track sections 9, 10, 11, 12 and 13. When the engine of the first east bound train enters track section 9 and its contact shoe 110 engages with distant contact rail 125, a current of maximum value will be received from batteries 131 and 132 as follows: from contact rail 125, contact shoe 110, wire 111, spring 112, movable coil 113, spring 114, wire 115 to the axle and wheel 116 of the locomotive, to track rail 134, wire 133, batteries 132, 131, wire 130, polar contact 129, wire 128, neutral contact 127, wire 126 to distant contact rail 125. The current strengths from the combined battery 131 and 132 is sufficient to move the semaphore arm 122 to its 90° position as is shown, in which position the arm will indicate to the engineman that the next block from the home marker 16 to the home marker 18 is clear and that he may run to the home marker 16 at which point he may expect to receive a second clear indication.

When the engine enters track section 10, track relay $R^{10}$ will be deënergized, opening the circuit to line relay $L^{15}$ which will open the cab control circuit at contact 127, which will cause the semaphore arm to return to its normal or horizontal position. This cab control circuit will also be broken when contact shoe 110 passes out of contact with contact rail 125.

When the engine approaches home marker 16 and its contact shoe 110 engages home contact rail 33, the cab control circuit through batteries 43 and 39 will be completed and the semaphore arm 122 again raised to its vertical or "clear" position, the circuit being as follows: from battery 39, wire 38, polar contact 37, wire 36, contact 35 of line relay $L^{16}$, wire 34, contact rail 33, contact shoe 110, wire 111, through the cab indicator to axle and wheel 116, contact rail 45, wire 44, battery 43 to battery 39. The closing of this circuit, will as before, give a clear indication such as the engineman would expect to receive after having received a clear indication at the distant marker 15.

Assuming that the first train occupies either of the track sections 11 or 12 of the block extending from marker 16 to marker 18, and a second train approaches marker 15 so that its contact shoe engages with contact rail 125, the occupancy of a train in either track sections 11 or 12 will deënergize either track relay $R^{11}$ or track relay $R^{12}$ which will open the circuit to the line relay $L^{16}$. Upon the deënergization of line relay $L^{16}$ its neutral contact 67 will open the control circuit for the distant line relay $L^{15}$ which will cause the neutral contact 127 of the line relay $L^{15}$ to open, thus opening the circuit of the distant contact rail 125, which will prevent the indicator upon the cab from being actuated, since no current will pass through the same. This failure of the indicator upon the cab to operate is the equivalent of a "stop" signal and will inform the engineman that he must "proceed at caution" and stop with his contact shoe upon home contact rail 33 where he must wait until he receives a "proceed" signal.

It will be noted that the distant contact rail, as 125, has the same control as the home contact rail 33, or in other words, the engineman will receive the same indication on distant contact rail 125 as he will receive on home contact rail 33. However, the "distant" marker arm 15 qualifies the indications received so that a "stop" signal received at a "distant" marker arm will be interpreted by the engineman to "proceed at caution" until arriving at the home contact rail.

Let us assume that the second train is proceeding at "caution" toward the limits of the block designated home marker 16 and that one of the track sections 11 or 12 are still occupied by the first train. When the contact shoe 110 engages contact rail 33, no current will pass through the cab-control circuit and the arm 122 will not move, which will indicate to the engineman that this block is still occupied and that he should "stop" and "proceed" only in accordance with the rules and regulations prescribed. This is true because when a train is either in track sections 11 or 12, one of the track relays $R^{11}$ or $R^{12}$ will be deënergized which will open the circuit to the line relay $L^{16}$ and open the cab-control circuit at the neutral contact 35. Let us assume that the first train instead of being in the block composed of track sections 11 and 12 has passed into the block in advance of home marker 18; that is, the train occupies track section 13 or the one in advance thereof. This will, as before described, due to the deënergization of track relay $R^{13}$, cause a deënergization of line relay $L^{18}$ and the front contacts 51 and 55 to the battery 53 will be broken and back contact 62 and 63 closed, which will cause a reversal of current in the control circuit wire 48 which passes through line relay $L^{16}$. The reversal of current in this line relay will cause the polarized contact 37 to move to cut out track battery 39 so that the cab-control circuit is closed only through track battery 43. Hence, the cab indicator in the second train, now on home contact rail 33, will only be moved to an intermediate or a 45° position, as before described, which will indicate to the engineman that there is a train in the block in advance and inform him to "proceed at caution". The train will then proceed to distant marker 17 under caution and if the block composed of track section 13 and the track section in advance thereof is still occupied by a train, no cab signal indication will be received at this point which will indicate to the engineman that the block is still occupied by a train. From this point on, the operation will continue as before described. It will therefore be noted that by the cab indicator described, and the system of track circuits associated therewith, a cab signal system is provided in which at the various home and distant locations along the trackway, a cab signal will be given which corresponds exactly and is identical with the same indication which would be given by a roadside signal, the system being, in so far as the information which is received by the engineman, identical, but since the cab signal is positioned within the engine, the liability of danger due to imperfect sight of the engineman, or to climatic conditions, will be overcome. Moreover, the expensive movable roadside signal may be entirely eliminated.

Referring now to Fig. 3, an embodiment of the invention will be described in which the indicator may be used as a switch indicator at an outlying switch, rather than as a cab indicator as is shown in Figs. 1 and 2. The mechanical construction of the switch indicator used is similar and need not be described so that the description will be limited to the manner in which the switch indicator is connected into a system. The switch indicator is a three-position signal as before and in the system described is adapted to be controlled by the movable roadside signals along the trackway, such automatic signals being shown and designated 150 and 153, which may be of any desired type. The switch indicators 138 and 146, located at switch X, are connected to and are controlled by signals 153 and 150 as follows:

West bound roadside signal 153 is shown in its 45° position which indicates that the block composed of track section $T^{153}$ and also T¹⁵⁴ (not shown) is clear, but that the next block section in advance (not shown) is occupied. The 45° position of the roadside signal 153 is repeated to switch indicator 138, which is positioned at the switch X as is shown. The circuit for controlling this switch indicator 138 is as follows: from battery 130, wire 133, 45° circuit controller 134ª which is operated by the roadside signal 153, and in its 45° position is in contact with the terminal at the end of wire 133 through wire 135, contact 136, which is controlled by track relay 152, line wire 137, switch indicator 138 and common wire 148 back to the battery 130. The current delivered by battery 130 is only sufficient to move the indicator arm 139 to an intermediate or 45° position as described in connection with the cab indicator. In the same manner, if the roadside signal 153 should be in its vertical or 90° position, the circuit controller 134 will be correspondingly moved and will contact with the terminal at the end of wire 132 so that the circuit to the switch indicator instead of passing only through battery 130, now passes through both batteries 130 and 131, which will give a 90° indication corresponding to the 90° indication of the movable roadside signal 153. In the same manner, if the roadside signal 153 is in its danger or horizontal position, its circuit controller will be in the position indicated by the dotted line 134ᵇ and the circuit to switch indicator 138 will be broken and a corresponding danger signal indication will be given at the switch indicator 138. It will, therefore, be seen that by placing a switch indicator as 138 at an outlying switch X, the condition of a single track road for westbound trains will be duplicated or repeated by the switch indicator. This will authorize a train on the siding Y to enter the main track and proceed west-bound to a signal 153.

Upon the right hand side of the drawing, the east-bound roadside signal 150 is shown in its normal 90° position which indicates that the two blocks in advance thereof is clear. The circuit for switch indicator 146 is as follows: from battery 140, wire 141, circuit controller 142 which is controlled by the movable roadside signal 150, wire 143, contact 144 of the track relay R¹⁵¹, line wire 145, switch indicator 146, at switch X, and common wire 148, back to the battery 140. Upon this side of the drawing, the battery 140 is in one section and is designed to be of sufficient strength to move the switch indicator arm to its 90° or "clear" position, in which position it is indicated upon the drawing. However, when the eastbound roadside signal 150 is in its 45° position, the circuit to the switch indicator 146 will, instead of passing as before described, pass through a resistance 149, which reduces the strength of current to approximately that which would be supplied by one battery 130, shown on the left, or in other words, reduces it sufficiently so that the strength of current passing through the switch indicator 146 is only sufficient to move the arm to an intermediate or 45° position. It will therefore be seen that by the use of this resistance, two batteries are not required, but it is regarded that the use of this resistance or the two batteries are the equivalent of each other and either one may be utilized as well as the other devices for passing current of different strengths through the indicator. The indications given by switch indicator 146 will authorize a train on the siding Y to enter the main track and proceed east-bound to signal 150, where it will be governed according to the indication displayed by that signal.

The indicator described may be put to various other numerous applications in electric railway signaling systems and it is not intended to limit the invention to the particular systems disclosed, or to the particular purposes to which it has been applied, but only by the scope of the appended claims.

I claim:

1. An electrical railway signaling system comprising a trackway, a cab upon the trackway, an electrical indicator in said cab having an arm whose angular movement is proportional to the strength of current passing therethrough, a single circuit in said cab connected to said indicator, and means including circuits and track batteries along the trackway controlled by traffic conditions for passing currents of different strengths through said indicator and its circuit.

2. An electrical railway signaling system comprising a trackway, a cab upon the trackway, an electrical indicator in said cab having a swinging arm whose angular displacement is proportional to the strength of current passing therethrough, a plurality of contact rails along the trackway, a single circuit in said cab adapted to connect the electrical indicator to said contact rails upon the cab passing thereover and track circuits connected to said contact rails having currents of different strengths passing therethrough, and means controlled by traffic conditions for controlling the energization of said track circuits.

3. A railway signaling system comprising a trackway, a cab upon the trackway, an electrical indicator in said cab having an arm whose angular displacement is substantially proportional to the strength of current passing therethrough, a plurality of contact rails along the trackway, a circuit in the cab adapted to connect said electrical cab indicator to said contact rails when the cab passes thereover, a plurality of circuits associated with each of said contact rails having currents of different strengths passing therethrough, a plurality of batteries along the trackway, pole changers associated with said batteries, means controlled by the passage of the cab along the trackway for actuating said pole changers, a polarized relay for controlling the circuits leading to the contact rails, and circuits associated with pole changers for controlling said polarized relays.

4. An electrical railway signaling system comprising a trackway, a cab upon the trackway, stationary home and distant markers along the trackway, an electrical indicator in said cab having an arm movable to a plurality of operative positions, and means along the trackway for actuating said arm as the car approaches a home or distant marker.

5. An electrical railway signaling system comprising a trackway, a cab upon the trackway, stationary home and distant markers along the trackway, an electrical indicator in said cab having an arm whose angular movement is proportional to the strength of current passing therethrough, a circuit on said cab connected to said indicator, and means including circuits along the trackway controlled by traffic conditions for passing currents of different strengths through said indicator and its circuit as the vehicle approaches a home or distant marker.

6. An electrical railway signaling system comprising a trackway, stationary home and distant markers along the trackway, a cab upon the trackway, an electrical indicator in said cab having a swinging arm whose angular displacement is proportional to the strength of current passing therethrough, a plurality of contact rails along the trackway to the rear of the home and distant markers, a circuit on said cab adapted to connect the electrical indicator to said contact rails when the cab passes thereover, track circuits connected to said contact rails having currents of different strengths passing therethrough, and means controlled by traffic conditions for controlling the energization of said track circuits.

7. An electrical indicator for railway signal systems comprising an angularly movable arm, means for angularly displacing said arm through substantially 90°, and means for obscuring said arm from view when it occupies one of its extreme positions.

8. An electrical indicator for railway signal systems comprising an angularly movable arm, a casing surrounding said arm, means in said casing for angularly displacing said arm, said casing having a window therein rendering said arm visible except in one extreme position thereof.

In witness whereof I subscribe my signature.

ROBERT J. HEWETT.

Copies of this patent may be obtained for five cents each, by addressing the "Commissioner of Patents, Washington, D. C."